United States Patent
Cerovic et al.

(10) Patent No.: US 11,948,183 B2
(45) Date of Patent: Apr. 2, 2024

(54) SYSTEM AND METHOD FOR DETECTING A CART-BASED LOSS INCIDENT IN A RETAIL STORE

(71) Applicant: Everseen Limited, Blackpool (IE)

(72) Inventors: Milutin Cerovic, Belgrade (RS); Djordje Nedeljkovic, Belgrade (RS); Irena Veljanovic, Belgrade (RS); Marko Milanovic, Belgrade (RS)

(73) Assignee: Everseen Limited, Blackpool (IE)

( * ) Notice: Subject to any disclaimer, the term of this patent is extended or adjusted under 35 U.S.C. 154(b) by 359 days.

(21) Appl. No.: 17/498,360

(22) Filed: Oct. 11, 2021

(65) Prior Publication Data

US 2023/0110741 A1    Apr. 13, 2023

(51) Int. Cl.
    *G06Q 30/0601*    (2023.01)
    *G06F 18/2431*    (2023.01)
    *G06T 7/20*        (2017.01)
    *G06T 7/70*        (2017.01)
    *G06V 20/52*       (2022.01)

(52) U.S. Cl.
    CPC ..... *G06Q 30/0633* (2013.01); *G06F 18/2431* (2023.01); *G06T 7/20* (2013.01); *G06T 7/70* (2017.01); *G06V 20/52* (2022.01); *G06T 2207/10016* (2013.01); *G06T 2207/20132* (2013.01); *G06T 2207/30232* (2013.01)

(58) Field of Classification Search
    CPC ... G06Q 30/0633; G06F 18/2431; G06T 7/20; G06T 7/70; G06T 2207/10016; G06T 2207/20132; G06T 2207/30232; G06V 20/52; G06V 10/82
    See application file for complete search history.

(56) References Cited

U.S. PATENT DOCUMENTS

| | | | |
|---|---|---|---|
| 2014/0164176 A1* | 6/2014 | Kitlyar | G06Q 30/0633 235/383 |
| 2015/0187080 A1* | 7/2015 | Kundu | A47F 9/045 382/103 |

(Continued)

OTHER PUBLICATIONS

Redmon, et al., You Only Look Once: Unified, Real-Time Object Detection, 2016, pp. 779-788.

(Continued)

*Primary Examiner* — Amara Abdi
(74) *Attorney, Agent, or Firm* — Young Basile Hanlon & MacFarlane, P.C.

(57) ABSTRACT

A method of detecting a cart-based loss incident in a retail store includes decoding one or more video frames of a video stream to obtain one or more motion vectors therefrom, detecting motion of a shopping cart within a cash register lane bounded by pre-defined tracking start and end points based on the one or more motion vectors, tracking a location of the shopping cart till the shopping cart reaches the pre-defined tracking end point, dynamically classifying the shopping cart in one of a plurality of classification statuses based on recognition of one or more items present in the shopping cart till the shopping cart reaches the pre-defined tracking end point, and generating an alert signal when the shopping cart is classified in a pre-defined classification status from the plurality of classification statuses at an alert threshold point between the pre-defined tracking start and end points.

17 Claims, 5 Drawing Sheets

(56) References Cited

U.S. PATENT DOCUMENTS

2021/0150728 A1* 5/2021 Ahmed .................... G06T 7/11
2021/0287013 A1* 9/2021 Carter .................... G06T 7/246
2021/0407103 A1* 12/2021 Tang ..................... G06V 40/25

OTHER PUBLICATIONS

Howard, et al., MobileNets: Efficient Convolutional Neural Networks for Mobile Vision Applications, Google Inc., Apr. 17, 2017, 9 pgs.

* cited by examiner

SYSTEM AND METHOD FOR DETECTING A CART-BASED LOSS INCIDENT IN A RETAIL STORE

TECHNICAL FIELD

The present disclosure relates to a system and a method for detecting a shopping cart based loss incident in a retail store, and more specifically to a system and method for reducing shopping cart based loss in retail industry, for instance, by preventing theft of items placed into the shopping cart and that may be moved out of the retail store without billing.

BACKGROUND

In various retail stores, customers can select sales items of their choice, and fill a shopping cart, basket or trolley with the selected sales items. While selecting the sales items, a customer may also keep his/her personal belongings, for example, a phone, or wallet or other miscellaneous types of belongings in the cart, basket or trolley thereby providing a comfortable shopping experience to the customer. Once the customer is done with the selection of sales items, the customer may move along with the shopping cart, basket or trolley to a manually operated cash register for making a payment for the selected sales item(s). In order to make payment, the customer should put all the sales items from the cart, basket or trolley onto a conveyor belt of the cash register, so that the sales items can be scanned by a cashier managing the cash register. However, the customer may sometimes, intentionally or accidentally fail to empty all the sales items from the shopping cart. As a result, the customer is not billed for the sales item that are left behind i.e., remain in the cart, basket or trolley. Thus, the retail store may experience financial loss arising from the unbilled sales item(s).

Conventional approaches to tackle and mitigate such financial loss arising from unbilled sales item(s) may employ individual monitoring of manually operated cash register lanes, to detect a shopping cart based loss. However, such conventional approaches have several shortcomings. For example, their scalability is limited because in order to track events in real-time, each manually operated cash register lane would require presence of an employee to monitor the cash register lane. This results in an increase in cost incurred to the retail store owner, as the retail store owner would have to hire more people for monitoring the cash register lane. Similarly, in an event of more than one shopping cart being queued at a cash register, it may be difficult for an employee to monitor all the shopping carts simultaneously. Also, for a large number of shopping cart transactions undertaken at a cash register, an employee must maintain constant and intense focus for the duration of the monitoring period. Thus, existing approaches are cumbersome, costly, inefficient, and time-consuming.

In view of the above, there is a need to provide a system that reduces the shopping cart based loss, without requiring an employee to manually monitor a cash register lane.

SUMMARY

This summary is provided to introduce a selection of concepts, in a simple manner, which are further described in detailed description appended later herein. This summary is neither intended to identify, or specify, any key, or essential, inventive concept of the subject matter, nor should it be used to determine, or limit, in any way, a scope of claims appended herein.

Various embodiments of the present disclosure provide a system and method to automatically recognize shopping carts containing non-scanned sales item(s) using only video footage captured by the surveillance cameras, and report the incident to the responsible cashier, thereby preventing, or eliminating, potential cart-based loss. The shopping cart based loss reduction system works only when a shopping cart is present in a cash register lane. Therefore, the shopping cart based loss reduction system tracks movements in a cash register lane only when a shopping cart is visible within a predefined distance of a cash register. This helps in reducing utilization time for a graphics processing unit (GPU) by a predefined amount, for example, 50%. Also, depending on a pattern of customer traffic in a given retail store, a cash register lane in the retail store may only be active for a part of the duration when the retail store is open. Thus, it is no longer necessary to monitor the occurrence of a potential alert scenario all day, every day. Indeed, in the interests of operational efficiency, monitoring for the occurrence of a potential alert scenario occurs while a customer is present at a cash register with a shopping cart and when the shopping cart based loss actually occurs. This increases overall efficiency and performance of the shopping cart based loss reduction system.

Further, the present disclosure employs a localization deep neural network, namely a mean intersection over union (mIOU) metric, for assessing performance of the localization deep neural network. Specifically, the known intersection over union (IoU) metric calculates a degree of overlap of a predicted location with a known location of a single object in an image. However, a problem with known conventional intersection over union (IoU) metric is that it does not address a situation in which multiple objects appear in an image and for which multiple predicted locations may or may not match locations of the multiple objects in the image. Such situations may occur in images captured of cash register lanes where multiple carts may be queued or moving at different rates in a cash register lane, or when multiple items are present in a single cart. The custom mIOU of the present disclosure is specifically designed to address this situation. To this end, the mIOU is adapted to penalize incidents in which a predicted location of a shopping cart fails to match any of the actual locations of shopping carts in an image, and incidents in which an actual location of a shopping cart in an image is not matched by any of the predicted locations of shopping carts in the image. Through the innovative design and especially customized configuration, the components of the present disclosure collectively enable it to operate in real-time to analyze up to 100 cash register lanes simultaneously, using only a single GPU.

Accordingly, in an aspect of the present disclosure, the system for detecting a shopping cart-based loss incident in a retail store includes a processing system that is configured to receive and decode a video stream comprising one or more video frames from a video camera to obtain one or more motion vectors therefrom, detect motion of a shopping cart within a cash register lane bounded by a pre-defined tracking start point and a pre-defined tracking end point based on the one or more motion vectors, track a location of the shopping cart till the shopping cart reaches the pre-defined tracking end point upon detection of motion of the shopping cart, dynamically classify the shopping cart in one of a plurality of classification statuses based on recognition of one or more items present in the shopping cart till the shopping cart reaches the pre-defined tracking end point, and generate an alert signal, when the shopping cart is classified in a pre-defined classification status from the plurality of classification statuses, at an alert threshold point between the pre-defined tracking start and end points.

In another aspect of the present disclosure, a method of detecting a cart-based loss incident in a retail store includes decoding one or more video frames of a video stream to obtain one or more motion vectors therefrom, detecting motion of a shopping cart within a cash register lane bounded by a pre-defined tracking start point and a pre-defined tracking end point based on the one or more motion vectors, tracking a location of the shopping cart till the shopping cart reaches the pre-defined tracking end point upon detection of motion of the shopping cart. The method also includes dynamically classifying the shopping cart in one of a plurality of classification statuses, based on recognition of one or more items present in the shopping cart till the shopping cart reaches the pre-defined tracking end point, and generating an alert signal when the shopping cart is classified in a pre-defined classification status from the plurality of classification statuses at an alert threshold point between the pre-defined tracking start and end points.

In yet another aspect, embodiments of the present disclosure are also directed to a non-transitory computer readable medium that is configured to store a program causing a processing system of a computer to detect a cart-based loss incident in a retail store.

Further benefits, goals and features of the system and the method will be described by the following specification of the attached figures, in which components of the system and method are exemplarily illustrated. Components of the system and method in the present disclosure, which match at least essentially with respect to their function, are marked with the same reference numeral, wherein such components may, or may not, be marked or described in all the accompanying figures.

The present disclosure is just exemplarily described with respect to the attached figures in the following.

BRIEF DESCRIPTION OF DRAWINGS

The present disclosure will be described and explained with additional specificity and detail with the accompanying figures in which.

Furthermore, the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the present disclosure, reference will now be made to the embodiment illustrated in the figures and specific language will be used to describe them. It will nevertheless be understood that no limitation of the scope of the pre sent disclosure is thereby intended. Such alterations and further modifications in the illustrated system, and such further applications of the principles of the present disclosure as would normally occur to those skilled in the art are to be construed as being within the scope of the present disclosure.

It will be understood by those skilled in the art that the foregoing general description and the following detailed description are exemplary and explanatory of the present disclosure and are not intended to be restrictive thereof.

The terms 'comprises', 'comprising', or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by 'comprises . . . a' does not, without more constraints, preclude the existence of other, sub-systems, elements, structures, components, additional sub-systems, additional elements, additional structures or additional components. Appearances of the phrase 'in an embodiment', 'in another embodiment' and similar language throughout this specification may, but not necessarily do, all refer to the same embodiment.

Unless otherwise defined, all technical and scientific terms used herein have the same meaning as commonly understood by those skilled in the art to which this present disclosure belongs. The system, methods, and examples provided herein are only illustrative and not intended to be limiting.

Embodiments of the present disclosure will be described below in detail with reference to the accompanying figures.

Figure 1:
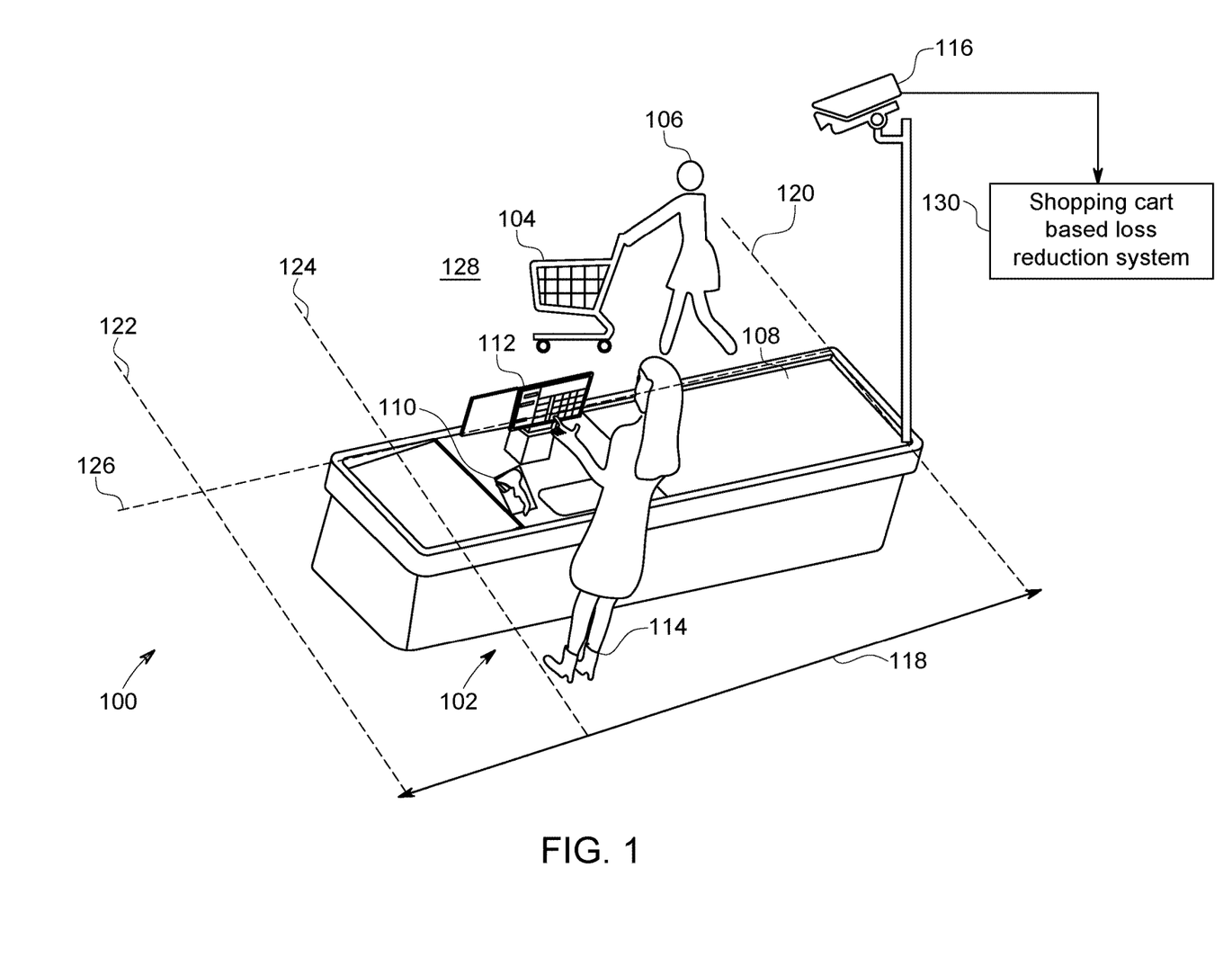
FIG. 1 illustrates a cash register environment, in accordance with various embodiments of the present disclosure.

FIG. 1 illustrates a cash register environment 100, according to various embodiments of the present disclosure. As shown, the cash register environment 100 includes a manned-lane cash register 102 for processing payments of sales items at a retail store and a shopping cart 104 for carrying one or more sales items selected by a customer 106 from the retail store. The cash register 102 includes a conveyer belt 108 for keeping i.e., receiving the sales items carried by the shopping cart 104, a scanner 110 for scanning the sales items received on the conveyer belt 108 and a display screen 112 for displaying the list of the sales items scanned along with price of each of the sales items. The cash register 102 is managed by a cashier 114. The shopping cart 104 may also include one or more personal belongings such as, but not limited to, a phone, or wallet or other miscellaneous types of belongings of the customer 106 that the customer 106 may have placed within the shopping cart 104.

Although the present disclosure is explained in conjunction with the shopping cart 104, it will be acknowledged that embodiments of the present disclosure are similarly applicable in scenarios where the retail store, or the customer 106, uses shopping baskets, or trolleys, in place of the shopping cart 104 disclosed herein. Therefore, a scope of the terms 'shopping cart' is not limited any specific configuration or type shown and described herein, rather, the scope of the terms 'shopping cart' can be extended to include other configurations such as trolleys, or baskets that are commonly known for use as a means for transporting one or more sales items to the cash register 102 for processing payments of the one or more sales items.

The cash register environment 100 further includes a video camera 116. The video camera 116 includes one or more video cameras installed at positions within a predefined distance from the cash register 102. Specifically, the video camera 116 includes surveillance video camera(s) installed at a position directly overhead the cash register 102 to provide a bird's eye view of the cash register 102 and its surroundings. The video camera 116 tracks the shopping cart 104 from an instant when the shopping cart 104 enters the manned-lane cash register 102 up until the shopping cart 104 leaves the field of view of the video camera 116, typically up to, or preferably, after the shopping cart 104 has exited the manned-lane cash register 102. Hereinafter, the period of entering and leaving the field of view of the video camera 116 is referred to as a transaction. For purposes of this disclosure, physical boundaries representing a start and an end of the transaction are shown as a tracking start point 120 and a tracking end point 124 respectively. Also, for purposes of this disclosure, a region between the tracking start point 120 and the tracking end point 124 adjacent to, or alongside, the cash register 102 is hereinafter referred to as a cash register lane 128.

The cash register environment 100 further includes a shopping cart-based loss reduction system 130 communicatively coupled to the video camera 116. It may be noted that the cash register environment 100 is shown to include only one cash register 102. However, it would be apparent to one of an ordinary skill in the art, that a retail store may have more than one cash register, for example, two, three, four or more cash registers for processing payments of sales items from multiple customers simultaneously, or in a concurrent manner.

In operation, the customer 106 selects sales items displayed in the retail store and fills the shopping cart 104 with the selected sales items. Upon reaching the cash register 102, the customer 106 places all the sales items from the shopping cart 104 on the conveyer belt 108. The cashier 114 scans the sales items and generates a bill payable by the customer 106 based on the scanned sales items displayed on the display screen 112. However, there may be an occasion in which all the sales items are not transferred from the shopping cart 104 onto the conveyor belt 108. These sales items may be left behind in the shopping cart 104 by the customer 106 accidentally i.e., inadvertently or willfully in order to commit a deliberate act of theft. For sake of clarity and to aid better understanding of the present disclosure, an event in which all the sales items in the shopping cart 104 are not transferred from the shopping cart 104 onto the conveyor belt 108 will hereinafter be referred to as a 'potential alert scenario'. The shopping cart based loss reduction system 130 seeks to detect potential alert scenarios with a view to potentially raise an alert when accidental, or willful, omission of billing sales items occur at the manned-lane cash register 102. For sake of simplicity, the terms 'manned-lane cash register 102' will hereinafter referred to as 'the cash register' and denoted using identical reference numeral '102').

While the cashier 114 helps the customer 106 with the billing process, the shopping cart-based loss reduction system 130 receives images of the shopping cart 104 and its surroundings from the video camera 116. Based on the received images, the shopping cart based loss reduction system 130 uses deep learning techniques and artificial intelligence (AI) to detect whether the shopping cart 104 contains either, or both, of the sales items and personal belongings or if the shopping cart 104 is empty. Based on this detection, the shopping cart based loss reduction system 130 implements a scoring system for potential alert scenarios to generate an alert, for example, an alarm, or a visual notification that informs the cashier 114 about unbilled sales items present in the shopping cart 104, thereby reducing financial loss arising from the unbilled sales items.

Figure 2:
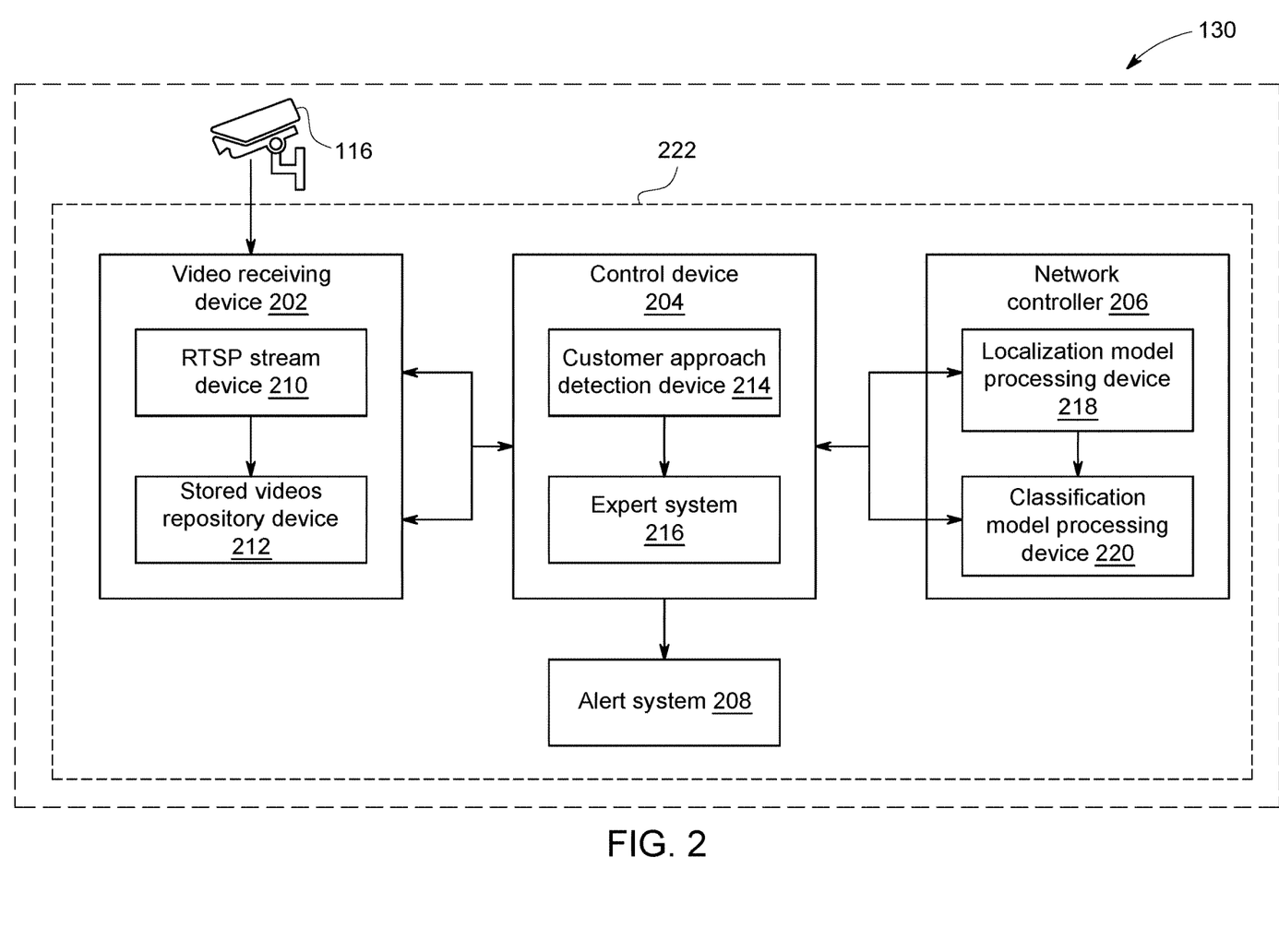
FIG. 2 illustrates a shopping cart based loss reduction system, in accordance with an embodiment of the present disclosure.

Referring to FIGS. 1 and 2, the shopping cart based loss reduction system 130 is illustrated, in accordance with an embodiment of the present disclosure.

The shopping cart based loss reduction system 130 includes a video receiving device 202, a control device 204, a network controller 206 and an alert system 208 communicatively coupled to each other. The video receiving device 202 includes a real time streaming protocol (RTSP) stream device 210 and a stored videos repository device 212. The RTSP stream device 210 is configured to receive a stream of video footage from the video camera 116 in accordance with a real time streaming protocol (RTSP). Mainly, the RTSP stream device 210 receives a stream of video footage from a video camera that is preferably installed at a position directly overhead the cash register 102. However, the RTSP stream device 210 may also receive a stream of video footage from one or more additional cameras installed at other positions lying within a pre-defined distance of the cash register 102 for better functioning of the video receiving device 202.

The video camera 116 captures video footage of an environment within its field of view. The video footage from the video camera 116 includes a plurality of successively captured video frames, wherein p is the number of video frames in the captured video footage. A given video frame $Fr(\tau+i\Delta t) \in \mathbb{R}^{n \times m}$ is captured by a video camera at time instant (also known as sampling time) $\tau+i\Delta t$ wherein $\tau$ is the time at which capture of the video footage starts and $\Delta t$ is the time interval (also known as the sampling interval) between capture of a first video frame and capture of a next video frame. Using this notation, the video footage $VID \in \mathbb{R}^{n \times (p \times m)}$ captured by a video camera of the video camera 116 can be described by equation 1 below:

$$VID \in \mathbb{R}^{n \times (p \times m)} = [Fr(\tau), Fr(\tau+\Delta t), Fr(\tau+2\Delta t) \ldots Fr(\tau+p\Delta t)] \quad (1)$$

wherein p is the number of video frames in the captured video footage as disclosed earlier herein.

Therefore, the RTSP stream device 210 includes a video footage received in real time from a cash register environment monitored by the video camera 116. The stored videos repository device 212 includes a local repository of video footage stored from previous periods of monitoring the cash register environment of the retail store. For example, the stored videos repository device 212 may include a stored video footage captured by one or more video cameras over a previous day or a previous week, depending on a type, or configuration, of a repository associated with, or present within, the stored videos repository device 212. Therefore, the stored videos repository device 212 includes a video footage historically captured by the video camera 116.

Once the video footage has been received, the video receiving device 202 transmits the received video footage from either or both of the RTSP stream device 210 and the stored videos repository device 212 to the control device 204, depending on one or more specific usage requirements of the retail store. The control device 204 includes a customer approach detection device 214 and an expert system 216. The customer approach detection device 214 processes the received video footage in a sequential manner and detects a customer approaching the cash register 102 with the shopping cart 102. Referring back to FIG. 1, for example, the customer approach detection device 214 detects the customer 106 approaching, together with the shopping cart 104, towards the cash register 102 based on the surveillance of the cash register environment by the video camera 116. The expert system 216 determines whether to command the issuance of an alert signal to the cashier 114, or any other staff/personnel in the retail store regarding an occurrence of a shopping cart-based loss event.

In an embodiment of the present disclosure, the customer approach detection device 214 receives the video footage from the video receiving device 202 using an adaptive sampling approach, in which a sampling rate is based on a speed with which the shopping cart 104 moves within the cash register lane 128. Therefore, when the shopping cart 104 moves quickly, the customer approach detection device 214 samples video frames from the video footage more frequently than in a case when the shopping cart 104 moves slowly. For example, if the shopping cart 104 moves at a pace of 0.5 m/s, then the sampling rate implemented the customer approach detection device 214 may be 12 frames per second (fps). However, if the shopping cart 104 moves at a pace of 1 m/s, then the customer approach detection device 214 may implement a higher sampling rate of, for example, 24 fps. It may be noted that the aforementioned values of sampling rates are merely exemplary in nature and hence, non-limiting of this disclosure. Other values of sampling rates may be adopted for use and implementation by the customer approach detection device 214 in accordance with specific requirements of a customer detection application used in the retail store. Moreover, the increase in sampling rates when changes in speed of the shopping cart 104 through the cash register lane 128 occur may be, for example, proportional, logarithmic, or even exponential in nature. Therefore, the customer approach detection device 214 may be configured to implement any manner of increasing, and thus, achieving a faster sampling rate without deviating from the spirit of the present disclosure.

In accordance with another embodiment of the present disclosure, the customer approach detection device 214 may employ other methods or rates of sampling. In the case of speed dependent sampling rate, the speed of movement of the shopping cart 104 within the cash register lane 128 may first be determined by the customer approach detection device 214 using a difference in one or more motion vectors determined from at least two or more image frames received from the video receiving device 202, for example, a video frame transmitted in real time by the RTSP stream device 210 and a historical video frame stored within the stored videos repository device 212. The rate of sampling the video frames may then be determined by the customer approach detection device 214 from the speed of movement of the shopping cart 104 previously determined by the customer approach detection device 214.

The customer approach detection device 214 processes successively captured video frames Fr(τ) and Fr(τ+Δt) in the received video footage to detect motion of the shopping cart 104 located within a pre-defined distance of the cash register 102, for example, within a span of the cash register lane 128. In an embodiment of the present disclosure, the video frames in the received video footage may be encoded using a H.264 video compression standard which uses, amongst other things, motion vectors in compressing the received video footage. The customer approach detection device 214 uses these motion vectors obtained from decoding of the H.264 encoded video frames to detect motion of the shopping cart 104.

In an embodiment of the present disclosure, the customer approach detection device 214 detects motion of the shopping cart 104 by a two-step processing method. In one embodiment, this two-step processing method may take around three minutes per video frame. However, in other embodiments, this two-step processing method may take a period more than, or appreciably, less than three minutes per video frame. In a first processing step, the customer approach detection device 214 filters the motion vectors that are obtained from decoding of the video frame based on a position and an orientation of each of the motion vectors. Particularly, in the first processing step, the customer approach detection device 214 extracts substantially horizontal orientated motion vectors that may be located in a pre-defined area, for example, an upper right area of the monitored cash register lane 128. In an embodiment of the present disclosure, the extracted motion vectors possess an orientation within a range of ±45° from the horizontal. Thereafter, the substantially horizontal orientated motion vectors are predominantly associated with the movement of the shopping cart 104 alongside the cash register 102 and corresponding conveyor belt 108. The substantial horizontal orientated motion vectors help the customer approach detection device 214 to distinguish between movements of the shopping cart 104 and those of other objects located within a pre-defined distance of the cash register 102, for instance, within the span of the cash register lane 128.

Figure 3:
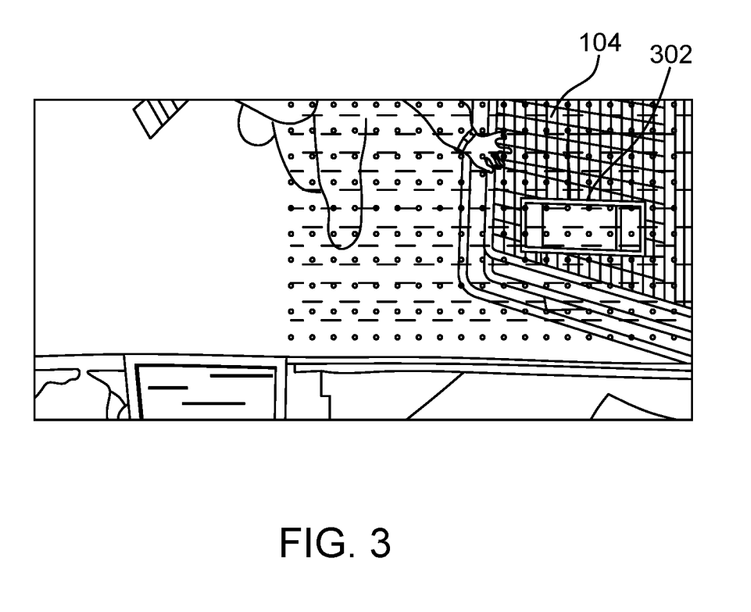
FIG. 3 illustrates horizontally oriented motion vectors based on a movement of the shopping cart, in accordance with an embodiment of the present disclosure.

FIG. 3 illustrates an exemplary outcome of the first processing step applied to an exemplary frame of a video footage by the customer approach detection device 214. The outcome illustrates the horizontally orientated motion vectors 302 based on the movement of the shopping cart 104. With combined reference to FIGS. 1-3, in a second processing step pursuant to the two-step processing method disclosed earlier herein, the customer approach detection device 214 calculates a sum of intensity values of the extracted substantially horizontal orientated motion vectors. The customer approach detection device 214 then compares the calculated sum of intensity values with an empirically defined threshold value that may be, for instance, defined as a global absolute value. If the calculated sum of intensity values exceeds the empirically defined threshold value, the customer approach detection device 214 issues an activation signal indicating detection of a presence, or movement, of the shopping cart 104 within the pre-defined distance of the cash register 102 i.e., within the span of the cash register lane 128. Thereafter, the customer approach detection device 214 sends the activation signal to the network controller 206 to cause the network controller 206 to become activated so that the network controller 206 is configured to process the video footage from an instant of its activation up until the shopping cart 104 passes the tracking end point 122 i.e., a boundary designating the end point of the cash register lane 128 as disclosed earlier herein.

The network controller 206 receives the activation signal from the customer approach detection device 214 and the video footage from the video receiving device 202 via the control device 204. In the absence of the activation signal, the network controller 204 is deactivated. Upon receipt of the activation signal, the network controller 206 is activated to process the received video footage by cropping a video frame sampled from the received video footage to establish a primary cropped region of the video frame. Thereafter, the network controller 206 transmits the primary cropped region of each sampled video frame to a localization model processing device 218 and a classification model processing device 220, both being configured with specialized deep learning networks.

The localization model processing device 218 processes the primary cropped region to determine a location of the shopping cart 104 in the cash register lane 128. The primary cropped region 118 represents a region of the cash register lane 128 in which the shopping cart 104 passes next to the cash register 102. The primary cropped region 118 is bracketed by, or bounded between, the tracking start point 120, the tracking end point 122 and a cropping line 126 that is aligned with a primary axis of the conveyor belt 108 and disposed within a pre-defined distance of an edge of the conveyor belt 108 furthest from the cashier 114.

In an embodiment of the present disclosure, the localization model processing device 218 employs a customized, fast convolutional neural network (Fast-CNN) possessing only around 350 thousand parameters that are taken into account by the Fast-CNN for processing the primary cropped region for determining a size and location of the shopping cart 104 when detected within a span of the cash register lane 128. Some of the parameters of the convolutional neural network and its architecture are shown exemplarily in Table 1 below.

TABLE 1

| Type of the layer | Filter Shape | Output Shape |
|---|---|---|
| InputLayer | | (None, 80, 420, 3) |
| Conv2D | 3 × 3 × 16 | (None, 80, 420, 16) |
| Conv2D | 3 × 3 × 16 | (None, 78, 418, 16) |
| ReLU | | (None, 78, 418, 16) |
| MaxPooling2D | 2 × 2 | (None, 39, 209, 16) |
| Dropout | | (None, 39, 209, 16) |
| Conv2D | 3 × 3 × 32 | (None, 39, 209, 32) |
| Dropout | | (None, 39, 209, 32) |
| Conv2D | 3 × 3 × 32 | (None, 37, 207, 32) |
| ReLU | | (None, 37, 207, 32) |
| MaxPooling2D | 2×2 | (None, 18, 103, 32) |
| Dropout | | (None, 18, 103, 32) |
| Conv2D | 3 × 3 × 128 | (None, 18, 103, 128) |
| Dropout | | (None, 18, 103, 128) |
| Conv2D | 3 × 3 × 128 | (None, 16, 101, 128) |
| ReLU | | (None, 16, 101, 128) |
| MaxPooling2D | 3 × 3 | (None, 5, 33, 128) |
| Dropout | | (None, 5, 33, 128) |
| Conv2D | 3 × 3 × 64 | (None, 5, 33, 64) |
| Dropout | | (None, 5, 33, 64) |
| Conv2D | 3 × 3 × 64 | (None, 3, 31, 64) |
| ReLU | | (None, 3, 31, 64) |
| MaxPooling2D | 3 × 3 | (None, 1, 10, 64) |
| Flatten | | (None, 640) |
| Dense | 70 | (None, 70) |
| Reshape | | (None, 2, 7, 5) |

The Fast-CNN employs a YOLOv1 loss function (J. Redmon, S. Divvala, R. Girshick and A Farhadi, 'You Only Look Once: Unified, Real-Time Object Detection' 2016 IEEE Conference on Computer Vision and Pattern Recognition (CVPR), Las Vegas, NV, USA, 2016, pp. 779-788) which has been customised to meet the requirements of detecting a size and location of the shopping cart 104 within the cash register lane 128. The resulting loss function focuses only on a part of the YOLOv1 loss function that is dedicated to the step of localization and comprises a localization loss component, a confidence loss that the cart 104 is detected, a confidence loss that the cart 104 is not detected, and a regularization component as shown below.

Localization loss $$\lambda_{coord}\sum_{i=0}^{S^2}\sum_{j=0}^{B}\mathbb{1}_{ij}^{obj}[(x_i - \hat{x}_i)^2 + (y_i - \hat{y}_i)^2] +$$

$$\lambda_{coord}\sum_{i=0}^{S^2}\sum_{j=0}^{B}\mathbb{1}_{ij}^{obj}\left[\left(\sqrt{w_i} - \sqrt{\hat{w}_i}\right)^2 + \left(\sqrt{h_i} - \sqrt{\hat{h}_i}\right)^2\right]$$

$$+\sum_{i=0}^{S^2}\sum_{j=0}^{B}\mathbb{1}_{ij}^{obj}(C_i - \hat{C}_i)^2 \quad \text{Confidence loss (detected)}$$

$$+\lambda_{noobj}\sum_{i=0}^{S^2}\sum_{j=0}^{B}\mathbb{1}_{ij}^{noobj}(C_i - \hat{C}_i)^2 \quad \text{Confidence loss (not detected)}$$

$$+\gamma\sum\|w\|_2 \quad \text{Regularization}$$

The localization model processing device 218 outputs the location and size of the shopping cart 104 using a plurality of bounding box coordinates for the shopping cart 104 detected in the cash register lane 128. The localization model processing device 218 may denote these bounding box coordinates by values of x, y, w and h variables. The x and y variables are coordinates of a center of a bounding box which encloses the shopping cart 104, the w variable represents a width of the bounding box, and the h variable represents a height of the bounding box. The values of the x, y, w and h variables are calculated relative to dimensions of an image/video frame. For sake of simplicity, the x, y, w and h variables will hereinafter be referred to as the 'bounding box coordinates'.

The convolutional neural network of the localization model processing device 218 is trained using a localization training dataset comprising images in RGB (red, green, blue) format obtained from one or more previously captured video footages comprising historical observations of customer activity at manually operated cash registers. The convolutional neural network of the localization model processing device 218 crops images usually in full high definition (HD) resolution (1920×1080 pixels) to establish the primary cropped regions thereof, resizes the cropped images to 420×80 pixels, and normalizes the resized cropped images. The convolutional neural network of the localization model processing device 218 then annotates each of the images of the resulting localization training dataset with a bounding box to tightly surround the shopping cart 104 visible in the image.

In an embodiment of the present disclosure, the localization training dataset disclosed herein may additionally be used as a basis for a classification training dataset that is, in turn, deployed for training a convolutional neural network in the classification model processing device 220. Accordingly, individual images in the localization training dataset may be provided with a label comprising details of one of the three following classes: empty cart, cart containing sales item(s), and cart containing personal item(s). However, for the purpose of training the convolutional neural network of the localization model processing device 218, only the coordinates of the bounding boxes in the localization training dataset may be used.

Further, to measure quality of the resulting trained localization model processing device 218, the convolutional neural network of the localization model processing device 218 calculates a mean intersection over union (mIOU) metric between locations corresponding to the bounding box coordinates predicted, and annotated, by the convolutional neural network for images of a localization validation dataset and the corresponding annotated bounding box locations in those images. The images of the localization validation, or test, dataset are prepared in a similar manner to the localization training dataset. For sake of simplicity in the present disclosure, the locations corresponding to the predicted bounding box coordinates will hereinafter be referred to 'the bounding box locations'.

Further, the convolutional neural network of the localization model processing device 218 filters between the bounding box locations predicted for each image by a confidence threshold. The convolutional neural network of the localization model processing device 218 further filters the filtered results by a non-maximum suppression procedure. Then, the convolutional neural network of the localization model processing device 218 sets a summed IOU (intersection over union) value to a pre-defined value, which may, for example, be a value of zero, besides setting an IOU (intersection over union) counter value to a pre-defined value, which may also, for example, be a value of zero. For a given image in the localization validation, or test, dataset, a predicted bounding box location which is within a pre-defined distance of an annotated bounding box is identified as being a matching predicted location for the annotated bounding box.

For each annotated bounding box location in an image,
(a) a matching predicted location which has the highest IOU with the annotated bounding box location is identified, its IOU is added to the summed IOU value; and the IOU counter value is incremented by a value of one; and
(b) In an event, a matching predicted location is not detected for a given annotated bounding box location in an image, a value of zero is added to the summed IOU value and the IOU counter value is incremented by a value of one.

Similarly, for each predicted bounding box location in the image that is not identified as being a matching predicted location, a value of zero is added to the summed IOU value and the IOU counter value is incremented by a value of one.

This process is repeated for each image in the localization validation, or test, dataset. Accordingly, the summed IOU value is increased according to:
(a) a number of images in the localization validation dataset;
(b) a number of annotated bounding box locations for which a matching predicted location is established in each such image; and
(c) a degree of overlap between closest matching predicted location for each such annotated bounding box location.

Similarly, the IOU counter value is increased according to:
(a) a number of images in the localization validation dataset;
(b) a number of annotated bounding box locations for which a matching predicted location is established in a given image;
(c) a number of annotated bounding box locations for which a matching predicted location is not established in each such image; and
(d) a number of predicted bounding box location in each such image that is not identified as being a matching predicted location.

A mean IOU is calculated from the summed IOU value divided by the IOU counter value. In this way, the mean IOU is effectively penalized by the number of unmatched predicted bounding boxes and the number of unmatched annotated bounding boxes resulting from the processing of the localization validation dataset by the convolutional neural network of the localization model processing device 218. The summed IOU value, the IOU counter value are re-set to their pre-defined values after each implementation of the validation process.

The classification model processing device 220 receives a location of the shopping cart 104 via the corresponding bounding box coordinates together with the primary cropped region of each sampled video frame from the localization model processing device 218. In an example, the classification model processing device 220 receives the bounding box coordinates of the shopping cart 104 in the cash lane register 128. The classification model processing device 220 is further configured to crop a secondary cropped region from the received primary cropped region, where the secondary cropped region matches a region enclosed by the bounding box coordinates. The classification model processing device 220 then resizes the secondary cropped region to form a resized secondary cropped region. The resized secondary cropped region may comprise a pre-defined number of pixels, for example, 224×224 pixels. Further, the classification model processing device 220 may apply different data augmentation techniques such as image rotation, image flip, image brightness, etc., to the secondary cropped region. The resulting cropped images (i.e., images of the resized secondary cropped region alone) are used by a deep neural network component of the classification model processing device 220 to classify status of the shopping cart 104 in the cash register lane 128 visible in the secondary cropped region, according to the content of the shopping cart 104. The classification model processing device 220 then classifies the shopping cart 104 in one of the three following classification statuses:
  a first pre-defined classification status denoting that the shopping cart 104 is empty or;
  a second pre-defined classification status denoting that the shopping cart 104 contains one or more sales items, and/or one or more personal belongings; and
  a third pre-defined classification status denoting that the shopping cart 104 contains one or more personal belongings only.

In illustrations of embodiments herein, and for sake of brevity in this disclosure, the first pre-defined classification status may be exemplarily referenced in conjunction with the term 'empty' to denote that the shopping cart 104 is empty. Similarly, the second pre-defined classification status may be exemplarily referenced in conjunction with the term 'cart with products' to denote that the shopping cart 104 includes one or more sales and personal belongings and the third pre-defined classification status may be exemplarily referenced in conjunction with the term 'cart with personal belongings' to denote that the shopping cart 104 includes one or more personal belongings. However, the exact aforementioned terms 'empty', 'cart with products', and 'cart with personal belongings' are merely illustrative and explanatory in nature and hence, are not to be construed as being limiting of this disclosure in any manner. Persons skilled in the art will acknowledge that other, or alternative, terms, alphabetical, numerical, or alphanumerical terms may be used to implement identical functionality i.e., classifying the shopping cart 104 under any of the first, second, and third pre-defined classification statuses without deviating from a spirit of the present disclosure.

In an embodiment of the present disclosure, the deep neural network component of the classification model processing device 220 employs a customized architecture based on the MobileNetV1 architecture (A. G. Howard, M. Zhu, B Chen, D. Kalenichenko, W. Wang, T Weyand. M Andreetto and H Adam, MobileNets: Efficient Convolutional Neural Networks for Mobile Vision Applications, retrieved from https://arxiv.org/abs/1704.04861 on 11 Mar. 2021). The customisation of the architecture of the deep neural network component of the classification model processing device 220 includes a reduction in the number of convolutional filters (75% of filters) compared with the MobileNetV1 architecture and an adjustment of a final, or last, layer to match the number of required classes to be output from the classification model processing device 220. Further, the classification model processing device 220 is validated using a confusion matrix. Although the MobileNetV1 architecture is disclosed herein, in other embodiments, other known deep neural networks capable of classifying data may be employed in lieu of MobileNetV1 disclosed herein. Also, as disclosed earlier herein, the convolutional neural network of the localization model processing device 218 uses the localization training dataset as a basis for a classification training dataset used for training a network in the classification model processing device 220.

Therefore, both the localization model processing device 218 and the classification model processing device 220 include deep neural networks. These neural networks, when combined, may possess only around, for example, 2 million parameters. This is significantly less than more than 20 million parameters encountered with use of standard object detection architectures such as Faster Region-based Convolutional Network (Faster R-CNN), Single Shot MultiBox Detector (SSD) and other commonly known object detection architectures. As a result, the neural networks in the localization model processing device 218 and the classification model processing device 220 have much faster inference times than standard object detection architectures. The neural networks in the localization model processing device 218 and the classification model processing device 220 are optimized using TensorRT, which enables optimization of various numerical operations that were previously required for inference and reduction of a model size on memory level, for instance, by reducing a precision of real numbers from to float 16 (or int8). This provides the shopping cart based loss reduction system 130 to reduce cart-based loss with a capability to monitor activity at, for example, 100 cash register lanes 128 simultaneously, while requiring the use of only a single graphics processing unit (GPU).

The expert system 216 receives the bounding box coordinates from the localization model processing device 218 and the shopping cart classification status from the classification model processing device 220. Thereafter, the expert system 216 processes the received bounding box coordinates and the classification status with one or more conditional logic units to establish one or more decision states for the shopping cart 104 during its journey between the tracking start point 120 and the tracking end point 122. These decision states may include, for instance, transaction valid, transaction validation pending, but are not limited thereto.

In an example, the expert system 216 establishes a decision state of a transaction validation pending for a monitored shopping cart 104 in an event when the expert system 216 receives a second pre-defined classification status i.e., cart with products from the classification model processing device 220 after the shopping cart 104 passes the tracking start point 120, thereby indicating that one or more sales items are present in the shopping cart 104 when the shopping cart 104 entered the cash register lane 128.

The expert system 216 issues an alert when the shopping cart 104 has an associated decision state of transaction validation pending upon reaching an alert threshold point which may be a location situated at, or before, the tracking end point 122 of the cash register lane 128, thereby indicating that the shopping cart 104 had contained sales item(s) while entering the cash register lane 128 i.e., at the tracking start point 120 and had not been emptied of those sales item(s) during its journey between the entry of the cash register lane 128 i.e., the tracking start point 120 and the alert threshold point i.e., a location situated at, or before, the tracking end point 122 of the cash register lane 128.

The expert system 216 establishes a decision state of transaction valid in the following events:
(a) Upon passing the tracking start point 120, the classification status of the shopping cart 104 changes from the second pre-defined classification status i.e., cart with one or more products/sales items to the first or third pre-defined classification status i.e., empty or cart with personal items at some point in the cash register lane 128 before reaching the tracking end point 122,
(b) Upon passing the tracking start point 120, the shopping cart 104 is classified under the first pre-defined classification status denoting that the shopping cart 104 is empty, and
(c) Upon passing the tracking start point 120, the shopping cart 104 is classified under the third pre-defined classification status denoting that the shopping cart 104 includes one or more personal items.

Figure 4A:
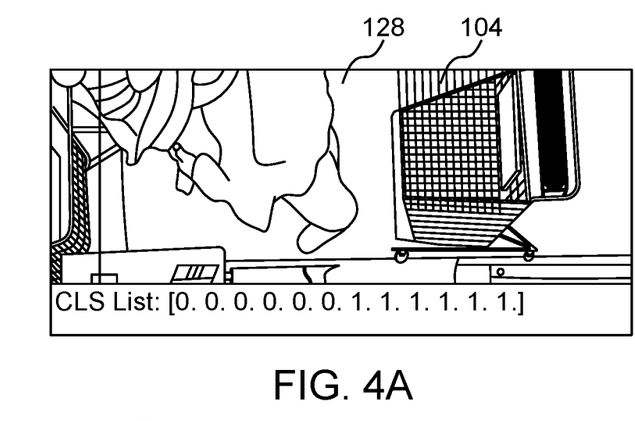
FIGS. 4A-4D illustrate exemplary decision states established for the shopping cart, in accordance with an embodiment of the present disclosure.
Figure 4B:
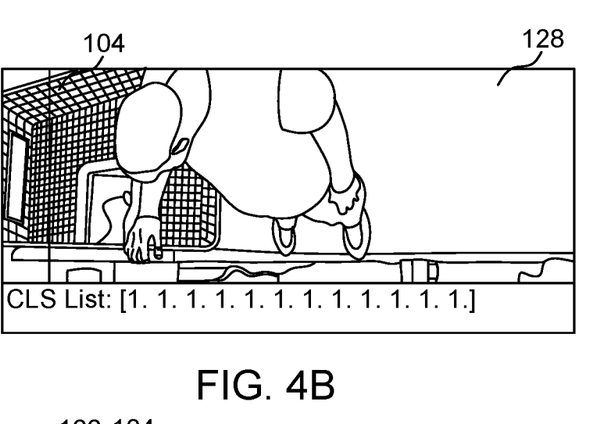
Figure 4C:
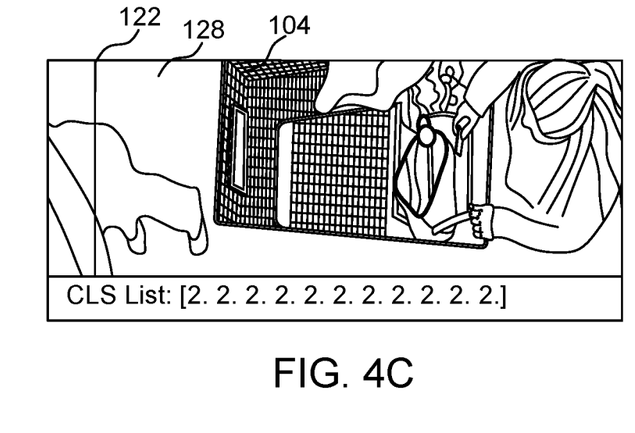
Figure 4D:
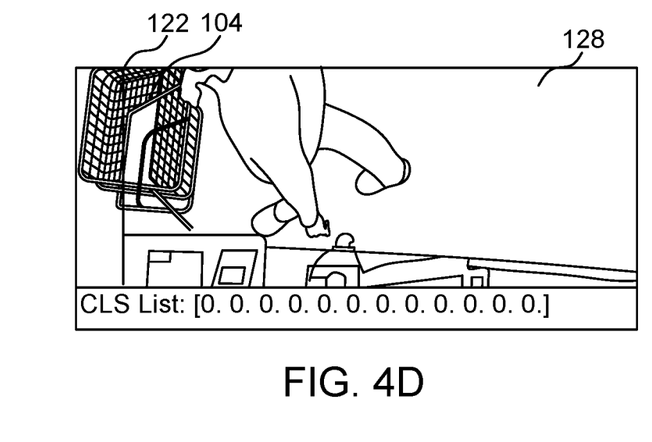

Upon attaining a transaction valid decision state, the shopping cart 104 retains this decision state for the remainder of its journey till the shopping cart 104 reaches the tracking end point 122. FIGS. 4A to 4D illustrate exemplary decision states established by the expert system 216. In FIG. 4A, the shopping cart 104 is in a queue in the cash register lane 128, and the decision state assessed for the shopping cart 104 is transaction validation pending. In FIG. 4B, the shopping cart 104 has a sales item still present therein and may be indicative of a potential alert scenario, and the decision state assessed for the shopping cart 104 is transaction validation pending. In FIG. 4C, the shopping cart 104 only has personal items before the tracking end point 122 and the decision state assessed for the shopping cart 104 is transaction valid. In FIG. 4D, the shopping cart 104 is empty after the tracking end point 122, and the decision state assessed for the shopping cart 104 is transaction valid.

In an embodiment of the present disclosure, the expert system 216 determines during a transaction, if a decision state associated with the shopping cart 104 should be changed from transaction validation pending to transaction valid. Accordingly, the decision state may be changed from an indication representative of transaction validation pending to an indication that the transaction is valid. The expert system 216 changes the decision state for the shopping cart 104 indicative of transaction validation pending to transaction valid if a sufficient number of previous video frames represent the first or third pre-defined classification status of the shopping cart 104 i.e., the shopping card 104 has been classified vis-à-vis the video frames under the first pre-defined classification status as empty or the third pre-defined classification status when the shopping cart 104 includes one or more personal belongings. For implementing changes to the decision state assessed, the number of previous video frames and the number of video frames representative of each of the first and third classification statuses is configurable by an operator.

After the expert system 216 has determined the decision state, the expert system 216 determines if the cart 104 has reached the alert threshold point, for example, the tracking end point 122. Upon reaching the alert threshold point, the expert system 216 issues an alert signal in an event a decision state associated with the shopping cart 104 is indicated as transaction validation pending, thereby indicating that the shopping cart 104 contained sales items on entering the cash register lane 128 and that such shopping cart 104 has not been emptied of those sales items during its journey between the tracking start point 120 of the cash register lane 128 and the alert threshold point, i.e., the tracking end point 122.

The expert system 216 generates and sends the issued alert signal to the alert system 208 to inform a cashier of a cash register or any other staff, or concerned personnel, in the retail store of an occurrence of a potential cart-based loss event.

In an embodiment of the present disclosure, the video receiving device 202, the control device 204, the network controller 206 and the alert system 208 together form a processing system 222 that may be communicatively coupled to the video camera 116. The processing system 222 may represent a computational platform that includes components that may reside on a server or another computer system, and execute, by use and implementation of a processor (e.g., a single or multiple processors) and other associated hardware of the processing system 222 described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The processing system 222 may execute software instructions, or code, that are stored on a non-transitory computer-readable storage medium to perform the method and functionalities that are consistent with those disclosed herein. In an example, the processing system 222 may be embodied as a Central Processing Unit (CPU) having one or more Graphics Processing Units (GPUs) executing these software codes.

Various embodiments of the present disclosure provide a unique and innovative composition of dedicated functional components. Specifically, these components include an event-driven activation system that is only required to process video footage and track customer movements i.e., together with their shopping cart, and particularly, upon detection of a customer approaching a cash register. In this way i.e., with implementation and use of embodiments disclosed herein, the GPU utilization time is reduced by, for example, at least 50% together with a corresponding reduction in bandwidth and power consumption from such GPU utilization. The components further include a customized high speed localization network for determining the location of a shopping cart within a cash register lane, and a customized classification network which is configured to classify a shopping cart according to its content i.e., shopping cart containing sales items alone, personal belongings alone, both—sales items and personal belongings, or as an empty shopping cart. These results of these processes are assigned to each instance of a shopping cart, which is being tracked in real-time using an expert system. As such, in an embodiment of the present disclosure, the processing system 222 may also include an expert system (not shown) that may be configured to use consecutive detections of the location and content of a tracked shopping cart to determine whether to issue an alert to an operator i.e., the cashier, or other personnel at the retail store, regarding the likely occurrence of a cart-based loss event. As part of the determination, the expert system may also be configured to establish a score for potential alert scenarios, that allows the expert system to rank subsequent, or other, potential alert scenarios according to their likelihood of occurrence, or from a perspective of severity of detection of cart-based loss desired by the retail store owner/management.

Figure 5:
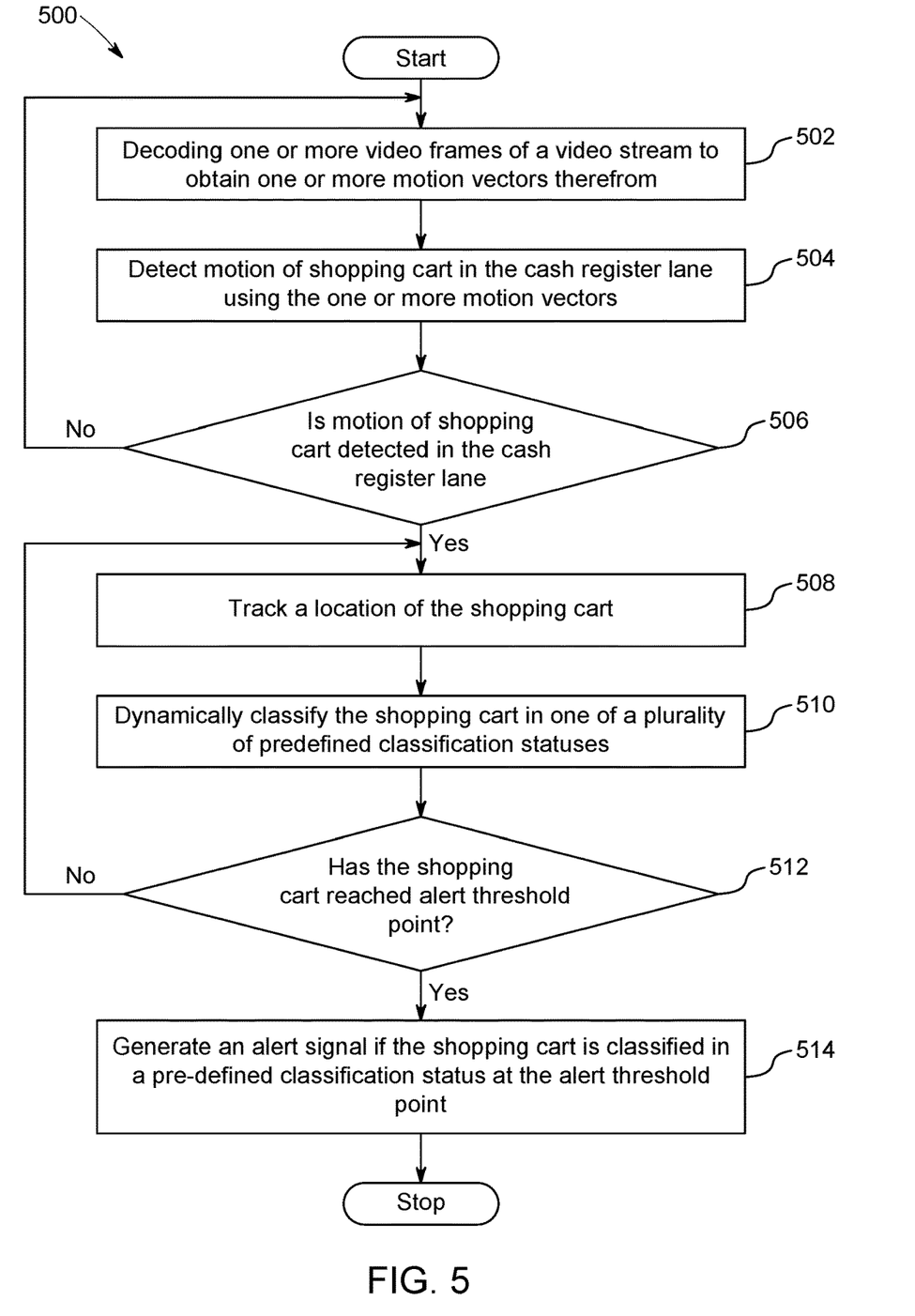
FIG. 5 is a flowchart illustrating a method for reducing shopping cart based loss, in accordance with an embodiment of the present disclosure.

FIG. 5 illustrates a method 500 for reducing shopping cart based loss, in accordance with an embodiment of the present disclosure. The method 500 will hereinafter be explained in conjunction to FIGS. 1-4. As shown, at step 502, the method 500 includes decoding one or more video frames of a video stream to obtain one or more motion vectors therefrom. As disclosed by way of an embodiment earlier herein, the video stream may include an H.264 encoded stream encoded using one or more motion vectors. Mainly, the stream of video footage is received from a video camera, of the video camera 116, installed directly overhead the cash register 102. However, the stream of video footage may also be received from one or more video cameras installed at multiple positions within an environment of the cash register 102. In an embodiment of the present disclosure, the video stream is received using an adaptive sampling approach, in which a sampling rate of the one or more video frames is determined based on a speed of the shopping cart in the cash register lane 128.

At step 504, the method 500 includes detecting motion of the shopping cart 104 within the cash register lane 128 bounded by a pre-defined tracking start point 120 and a pre-defined tracking end point 122 based on the one or more motion vectors obtained in step 502. In an embodiment of the present disclosure, presence of filtered motion vectors in a video frame of the H.264 encoded stream is checked to detect motion of the shopping cart 104. The tracking start point 120 and the tracking end point 122 are located in the same cash register lane 128 and at a pre-defined distance from at least one side of the cash register 102. As disclosed earlier herein, the motion of the shopping cart 104 is detected based on the one or more motion vectors obtained upon decoding of the one or more video frames of the video stream.

At step 506, the method 500 includes checking if a motion of the shopping cart 104 is detected in the cash register lane 128. If the motion of the shopping cart is not detected, steps 502 and 504 are repeated again until the motion of the shopping cart 104 is indeed detected in the cash register lane 128. If the motion of the shopping cart 104 is detected in the cash register lane 128 i.e., the shopping cart is disposed between the predefined tracking start and end points 120, 122, the method 500 proceeds from step 506 to step 508.

At step 508, the method 500 includes tracking a location of the shopping cart 104 till the shopping cart 104 reaches the pre-defined tracking end point 122. At step 510, the method 500 includes dynamically classifying the shopping cart 104 in one of multiple classification statuses based on recognition of one or more items present in the shopping cart 104 till the shopping cart 104 reaches the pre-defined tracking end point 122. In an embodiment of the present disclosure, the plurality of classification statuses includes a first pre-defined classification status denoting that the shopping cart 104 is empty, a second pre-defined classification status denoting that the shopping cart 104 includes one or more sales and personal belongings, and a third pre-defined classification status denoting that the shopping cart 104 includes one or more personal belongings.

At step 512, the method 500 includes determining if the shopping cart 104 has reached the alert threshold point, for instance, at a location situated at, or before, the tracking end point 122. If the shopping cart 104 has not reached the alert threshold point, then steps 508 and 510 are repeated till the shopping cart 104 reaches the alert threshold point. Otherwise, the method proceeds from step 512 to step 514.

At step 514, the method 500 includes generating the alert signal when the shopping cart 104 is classified in a pre-defined classification status from the plurality of classification statuses at the alert threshold point between the pre-defined tracking start and end points 120, 122. The alert signal may inform, or notify, the cashier associated with the cash register 102, or any other staff, or personnel, associated with the retail store of the occurrence of a potential cart-based loss event.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A method of detecting a cart-based loss incident in a retail store, the method comprising:
   decoding one or more video frames of a video stream to obtain one or more motion vectors therefrom,
     wherein the video stream includes an H.264 video stream encoded using the one or more motion vectors;
   filtering the one or more motion vectors according to a position and an orientation of each motion vector from the one or more motion vectors to extract one or more substantially horizontal orientated motion vectors located in a pre-defined region of a cash register lane;
   comparing a sum of intensity values of the extracted substantially horizontal orientated motion vectors with a threshold value;
   detecting motion of a shopping cart within the pre-defined region of the cash register lane bounded by a pre-defined tracking start point and a pre-defined tracking end point when the sum of intensity values exceeds the threshold value;
   tracking a location of the shopping cart till the shopping cart reaches the pre-defined tracking end point, upon detection of motion of the shopping cart;
   dynamically classifying the shopping cart in one of a plurality of classification statuses, based on recognition of one or more items present in the shopping cart, till the shopping cart reaches the pre-defined tracking end point; and
   generating an alert signal, when the shopping cart is classified in a pre-defined classification status from the plurality of classification statuses, at an alert threshold point between the pre-defined tracking start and end points.

2. The method of claim 1, further comprising receiving the video stream from at least one of: a surveillance video camera installed at a position directly overhead a cash register, and one or more surveillance cameras installed at multiple positions within an environment of the cash register, and wherein said pre-defined tracking start and end points are located in the cash register lane at a pre-defined distance from at least one side of the cash register.

3. The method of claim 1, wherein the plurality of classification statuses includes a first pre-defined classification status denoting that the shopping cart is empty, a second pre-defined classification status denoting that the shopping cart includes one or more sales items and personal belongings, and a third pre-defined classification status denoting that the shopping cart includes one or more personal belongings.

4. The method of claim 1, further comprising receiving the video stream using an adaptive sampling approach, wherein the adaptive sampling approach includes determining a sampling rate for the one or more video frames based on a speed of movement of the shopping cart in the cash register lane.

5. The method of claim 1, further comprising:
   cropping a current video frame sampled from the received video stream to generate a primary cropped region of the current video frame, wherein the primary cropped region is bracketed by the pre-defined tracking start and end points together with a cropping line aligned with a primary axis of a conveyor belt of the cash register lane;
   determining a current location and a size of the shopping cart based on the primary cropped region;
   cropping the primary cropped region to generate a secondary cropped region including the shopping cart; and
   determining a current classification status of the shopping cart at the current location by processing the secondary cropped region.

6. The method of claim 5, further comprising establishing one or more decision states for the shopping cart during a journey of the shopping cart between the pre-defined tracking start and end points, based on a corresponding one of the pre-defined classification statuses of the shopping cart at respective ones of one or more locations between the pre-defined tracking start and end points.

7. The method of claim 6, further comprising:
   establishing a decision state of the shopping cart as transaction validation pending when the shopping cart is classified under the second pre-defined classification status after passing the tracking start point; and
   generating the alert signal when the decision state of the shopping cart has been established as transaction validation pending upon reaching the alert threshold point.

8. The method of claim 6, further comprising:
   establishing a decision state of the shopping cart as transaction valid when the shopping cart is classified under one of:
     the first pre-defined classification status upon reaching the pre-defined tracking end point, the third pre-defined classification status upon reaching the pre-defined tracking point, and changes from the second pre-defined classification status to the first or third pre-defined classification status before reaching the pre-defined tracking end point.

9. The method of claim 1, further comprising employing a mean Intersection over Union (mIOU) technique to track the location of the shopping cart.

10. A system for detecting a shopping cart-based loss incident in a retail store, the system comprising:
a processing system configured to:
receive and decode a video stream comprising one or more video frames from a video camera to obtain one or more motion vectors therefrom,
wherein the video stream includes an H.264 video stream encoded using the one or more motion vectors;
filter the one or more motion vectors according to a position and an orientation of each motion vector from the one or more motion vectors to extract one or more substantially horizontal orientated motion vectors located in a pre-defined region of a cash register lane;
compare a sum of intensity values of the extracted substantially horizontal orientated motion vectors with a threshold value;
detect motion of a shopping cart within the pre-defined region of the cash register lane bounded by a pre-defined tracking start point and a pre-defined tracking end point when the sum of intensity values exceeds the threshold value;
track a location of the shopping cart till the shopping cart reaches the pre-defined tracking end point, upon detection of motion of the shopping cart;
dynamically classify the shopping cart in one of a plurality of classification statuses, based on recognition of one or more items present in the shopping cart, till the shopping cart reaches the pre-defined tracking end point; and
generate an alert signal, when the shopping cart is classified in a pre-defined classification status from the plurality of classification statuses, at an alert threshold point between the pre-defined tracking start and end points.

11. The system of claim 10, wherein the processing system is further configured to receive the video stream from at least one of: a surveillance video camera installed at a position directly overhead a cash register, and one or more surveillance cameras installed at multiple positions within an environment of the cash register, and wherein said pre-defined tracking start and end points are located in the cash register lane at a pre-defined distance from at least one side of the cash register.

12. The system of claim 10, wherein the plurality of classification statuses includes a first pre-defined classification status denoting that the shopping cart is empty, a second pre-defined classification status denoting that the shopping cart includes one or more sales items and personal belongings, and a third pre-defined classification status denoting that the shopping cart includes one or more personal belongings.

13. The system of claim 10, wherein the processing system is further configured to:
receive the video stream using an adaptive sampling approach, wherein the adaptive sampling approach implemented by the processing system facilitates the processing system to determine a sampling rate for the one or more video frames based on a speed of movement of the shopping cart in the cash register lane.

14. The system of claim 10, wherein the processing system is further configured to:
crop a current video frame sampled from the received video stream to generate a primary cropped region of the current video frame such that the primary cropped region is bracketed by the pre-defined tracking start and end points together with a cropping line aligned with a primary axis of a conveyor belt of the cash register lane;
determine a current location and a size of the shopping cart based on the primary cropped region;
crop the primary cropped region to generate a secondary cropped region including the shopping cart; and
determine a current classification status of the shopping cart at the current location by processing the secondary cropped region.

15. The system of claim 14, wherein the processing system is further configured to:
establish a decision state of the shopping cart as transaction valid when the shopping cart is classified under one of:
the first pre-defined classification status upon reaching the pre-defined tracking end point,
the third pre-defined classification status upon reaching the pre-defined tracking point, and
changes from the second pre-defined classification status to the first or third pre-defined classification status before reaching the pre-defined tracking end point; and
establish a decision state of the shopping cart as transaction validation pending when the shopping cart is classified under the second pre-defined classification status after passing the tracking start point; and
generate the alert signal, when the decision state of the shopping cart has been established as transaction validation pending upon reaching the alert threshold point.

16. The system of claim 10, wherein the processing system is further configured to employ a mean Intersection over Union (mIOU) technique to track the location of the shopping cart.

17. A non-transitory computer readable medium configured to store a program causing a processing system of a computer to detect a cart-based loss incident in a retail store, said program configured to:
decode a video stream comprising one or more video frames to obtain one or more motion vectors therefrom, wherein the video stream includes an H.264 video stream encoded using the one or more motion vectors;
filter the one or more motion vectors according to a position and an orientation of each motion vector from the one or more motion vectors to extract one or more substantially horizontal orientated motion vectors located in a pre-defined region of a cash register lane;
compare a sum of intensity values of the extracted substantially horizontal orientated motion vectors with a threshold value;
detect motion of a shopping cart within the pre-defined region of the cash register lane bounded by a pre-defined tracking start point and a pre-defined tracking end point when the sum of intensity values exceeds the threshold value;

track a location of the shopping cart till the shopping cart reaches the pre-defined tracking end point, upon detection of motion of the shopping cart;

dynamically classify the shopping cart in one of a plurality of classification statuses, based on recognition of one or more items present in the shopping cart, till the shopping cart reaches the pre-defined tracking end point; and generate an alert signal, when the shopping cart is classified in a pre-defined classification status from the plurality of classification statuses, at an alert threshold point between the pre-defined tracking start and end points.

\* \* \* \* \*